(12) United States Patent
Kuwabara

(10) Patent No.: US 10,442,207 B2
(45) Date of Patent: Oct. 15, 2019

(54) LIQUID SURFACE DETECTOR, LIQUID COATING DEVICE, AND LIQUID DISCHARGE APPARATUS

(71) Applicant: RICOH COMPANY, LTD., Tokyo (JP)

(72) Inventor: Akitomo Kuwabara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 52 days.

(21) Appl. No.: 15/583,087

(22) Filed: May 1, 2017

(65) Prior Publication Data
US 2017/0333932 A1 Nov. 23, 2017

(30) Foreign Application Priority Data

May 17, 2016 (JP) .................................. 2016-098604
Mar. 17, 2017 (JP) .................................. 2017-053274

(51) Int. Cl.
  *B41J 2/175* (2006.01)
  *G01F 23/24* (2006.01)
  *B41J 11/00* (2006.01)

(52) U.S. Cl.
  CPC .......... *B41J 2/17566* (2013.01); *B41J 2/175* (2013.01); *B41J 2/17563* (2013.01); *B41J 11/0015* (2013.01); *G01F 23/242* (2013.01)

(58) Field of Classification Search
  CPC .................... B41J 2002/17579; B41J 2/17566
  See application file for complete search history.

(56) References Cited

U.S. PATENT DOCUMENTS

| | | | | |
|---|---|---|---|---|
| 3,895,402 A | * | 7/1975 | Page | G01F 23/241 137/448 |
| 3,947,692 A | * | 3/1976 | Payne | G01F 23/241 73/304 R |
| 4,099,167 A | * | 7/1978 | Pomerantz | G01F 23/265 340/620 |
| 4,169,377 A | * | 10/1979 | Scheib | G01F 23/241 73/304 R |
| 4,433,577 A | * | 2/1984 | Khurgin | G01F 23/24 73/216 |
| 4,637,424 A | * | 1/1987 | Morgan | G01F 23/242 137/392 |
| 5,583,544 A | * | 12/1996 | Stamer | B41J 2/17566 347/7 |
| 2006/0152230 A1 | * | 7/2006 | Franke | G01F 23/265 324/661 |
| 2011/0303004 A1 | * | 12/2011 | Carson-Rowland | G01F 23/24 73/304 R |
| 2016/0075150 A1 | * | 3/2016 | Sunaoshi | B41J 2/17566 347/21 |

FOREIGN PATENT DOCUMENTS

JP 2009-291959 12/2009

* cited by examiner

*Primary Examiner* — Binu Thomas
(74) *Attorney, Agent, or Firm* — Oblon, McClelland, Maier & Neustadt, L.L.P.

(57) ABSTRACT

A liquid surface detector includes a tube through which a liquid passes; an electrode pin disposed on an inner wall of the tube; and a ground pin disposed on the inner wall of the tube. In the liquid surface detector, the electrode pin and the ground pin are disposed in different directions as viewed from an axial direction of the tube.

5 Claims, 7 Drawing Sheets

LIQUID SURFACE DETECTOR, LIQUID COATING DEVICE, AND LIQUID DISCHARGE APPARATUS

CROSS-REFERENCE TO RELATED APPLICATIONS

The present application claims priority pursuant to 35 U.S.C. § 119(a) from Japanese patent application numbers 2016-098604 and 2017-053274, filed on May 17, 2016 and Mar. 17, 2017, respectively, the entire disclosure of each of which is incorporated by reference herein.

BACKGROUND

Technical Field

Exemplary embodiments of the present disclosure relate to a liquid surface detector, a liquid coating device, and a liquid discharge apparatus.

Background Art

Certain inkjet printers employ a device to coat a pretreatment liquid on a recording medium as a method for preventing deterioration of image quality. Further, an electrode pin and a ground pin are disposed in an inkjet printer to detect a height of the liquid surface of the pretreatment liquid, so that the liquid amount of the pretreatment liquid is kept constant.

SUMMARY

In one embodiment of the disclosure, provided is an optimal liquid surface detector including a tube through which a liquid passes; an electrode pin disposed on an inner wall of the tube; and a ground pin disposed on the inner wall of the tube. In the liquid surface detector, the electrode pin and the ground pin are disposed in different directions as viewed from an axial direction of the tube.

In another embodiment of the disclosure, provided is an optimal liquid coating device including a liquid surface detector that includes a tube through which a liquid passes, an electrode pin disposed on an inner wall of the tube, and a ground pin disposed on the inner wall of the tube. The liquid coating device further includes a coating roller to apply the liquid onto a recording target medium; and a liquid supplying device to supply the liquid to the coating roller. The liquid surface detector detects a height of a liquid surface of the liquid in the liquid supplying device.

In another embodiment of the disclosure, provided is an optimal liquid discharge apparatus including the liquid coating device as described above, to apply the liquid to the recording target medium; and a liquid discharge head to discharge another liquid onto the recording target medium.

These and other features and advantages of the present disclosure will become apparent upon consideration of the following description of embodiments of the present disclosure when taken in conjunction with the accompanying drawings.

BRIEF DESCRIPTION OF THE DRAWINGS

The aforementioned and other aspects, features, and advantages of the present disclosure would be better understood by reference to the following detailed description when considered in connection with the accompanying drawings, wherein.

DETAILED DESCRIPTION

Before explaining embodiments of the present disclosure, an explanation is added to the above-described background art.

Unlike the ink, a treatment liquid such as a pretreatment liquid to be applied to a recording target medium includes compounds that corrode metal. Generally, two metallic electrodes are prepared as a liquid surface detector that detects a leaked liquid or existence of the liquid inside the container. An alternating voltage is applied to one of the metallic electrodes and the other electrode is grounded to detect the impedance between the electrodes. The detected impedance is converted to a direct voltage and compared to a reference voltage, to detect a difference between the two voltages that indicates the presence of a liquid.

The alternating voltage is to be applied to the two electrodes as described above, and the corrosion of the electrode pins immersed in the treatment liquid continues due to electrolysis. With this, foreign substance eluted from the electrode pins accumulates on a surface or a base of the electrode pins, which causes a slight conduction state between the two electrode pins. As a result, a liquid surface detector erroneously detects the presence of liquid even though no treatment liquid is present in the container.

In addition, because the viscosity of the treatment liquid is higher than the viscosity of water, the height of the liquid inside the detector at which the liquid surface detector indicates that there is no liquid and the height of the liquid inside the container are different due to wettability between the two electrode pins. As a result, the liquid surface detector may not perform detection properly.

Figure 1:
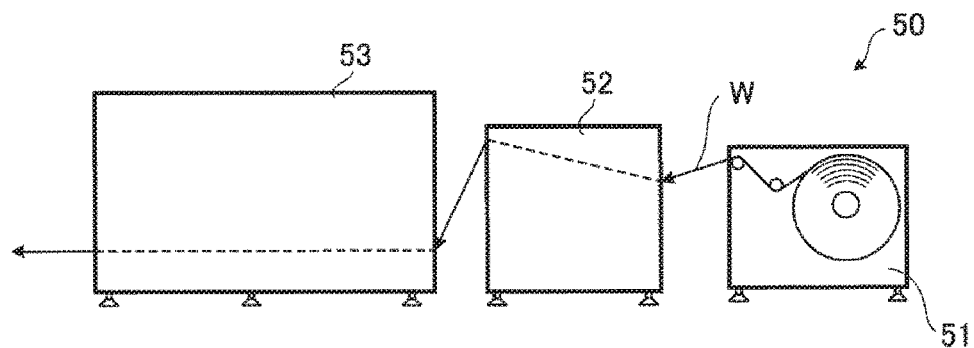
FIG. 1 schematically illustrates a front view of an image forming system to which an embodiment of the present disclosure is applied.

FIG. 1 illustrates an image forming system 50 employing an inkjet method to which embodiments of the present disclosure can be applied. In FIG. 1, the image forming system 50 includes a sheet feeder 51, a pretreatment liquid coating device 52 that serves as liquid coating device, and an inkjet printer 53 that serves as an image forming apparatus. A web W is a recording target medium sent or transported from the sheet feeder 51 and is sent to the pretreatment liquid coating device 52, in which the pretreatment liquid is applied to the web W. Herein, the pretreatment liquid (a first liquid) functions to coagulate ink on the surface of the recording target medium before ink droplets land on the surface, to resolve various problems in the image formation such as bleeding, uneven density or color tone, setting-off of the images. The face on which the pretreatment liquid is coated may be one or both sides depending on the desired material of image formation. The web W is a long, continuous sheet.

In the following explanation, the term "liquid" means the pretreatment liquid and is different from the ink for forming the image. If it is necessary to specify, the pretreatment liquid is specified as the first liquid and the ink for forming the image is specified as the second liquid.

The web W to which the pretreatment liquid has been applied by the pretreatment liquid coating device 52, is sent into the first inkjet printer 53, and ink droplets are discharged on one side of the web W, to thereby a desired image is formed. Then, the web W is turned over by a reversing device so that the front and the back are reversed, and is sent into a second inkjet printer. The ink droplets are discharged onto the other side of the web W, to form a desired image. The web W is then sent to a post-treatment device and is processed with a predetermined post-treatment.

Figure 2:
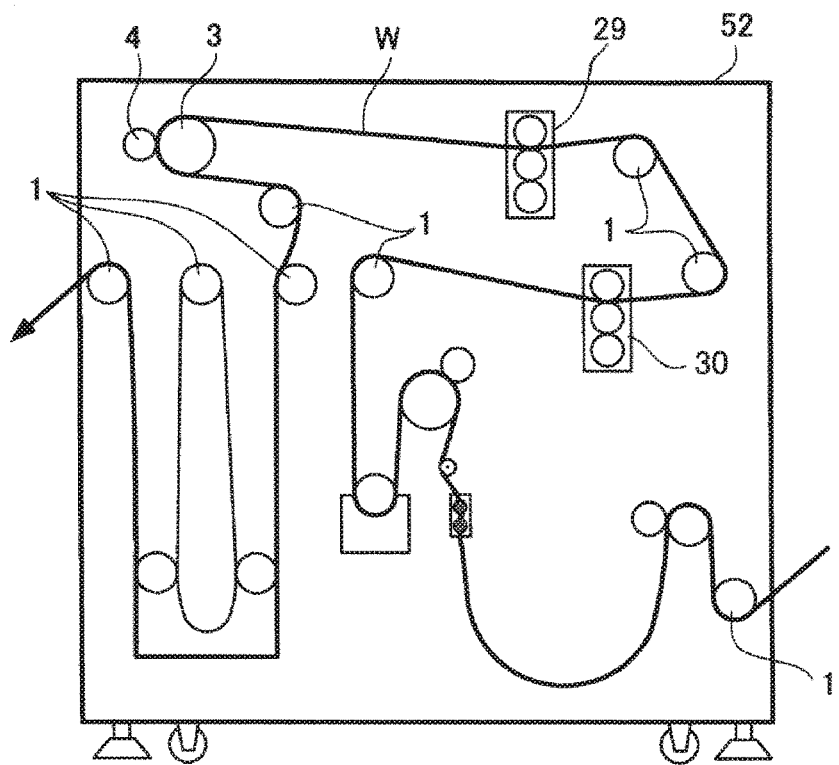
FIG. 2 schematically illustrates a front view of a liquid coating device to which an embodiment of the present disclosure is applied.

FIG. 2 schematically illustrates the pretreatment liquid coating device 52. A plurality of guide rollers 1 each having shaft bearings at both ends is rotatably disposed inside the pretreatment liquid coating device 52. With the plurality of guide rollers 1, a conveyance path of the web W is formed.

Further, a front side coating device 29 and a backside coating device 30 are disposed inside the pretreatment liquid coating device 52. The front side coating device 29 applies the pretreatment liquid onto the front side of the web W and the backside coating device 30 onto the backside of the web W. The web W, while passing through the backside coating device 30 and the front side coating device 29 sequentially, is applied with the pretreatment liquid on two sides of the web W.

The web W on which the applied pretreatment liquid has been dried during transportation, passes through a portion between a feed roller 3 rotated by, e.g., a motor and a feed nip roller 4 pressed against the feed roller 3 by a biasing force of a biasing unit, and is sent to the inkjet printer 53. Image forming process will be later described in detail.

Figure 3A:
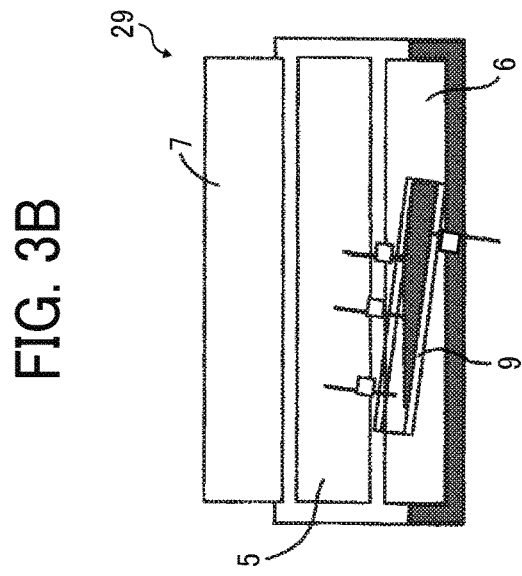
FIGS. 3A and 3B schematically illustrate structures of a front side coating device and a backside coating device to which an embodiment of the present disclosure is applied.
Figure 3B:
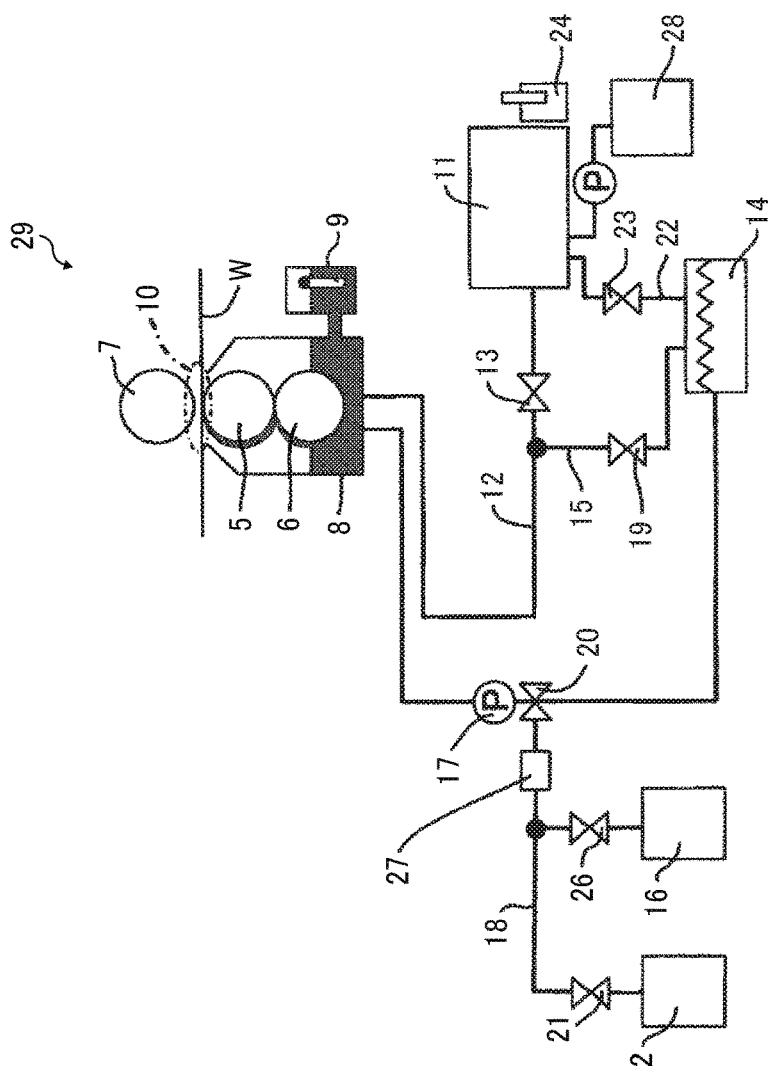

FIGS. 3A and 3B schematically illustrate the front side coating device 29 and the backside coating device 30 (hereinafter, collectively referred to as the coating device 29), and FIG. 3A illustrates a structure to supply and transfer the pretreatment liquid to the coating device 29. FIG. 3A is a front view of the coating device 29 and FIG. 3B is a side view of the coating device 29.

As illustrated in FIG. 3A, the coating device 29 is disposed in the conveyance path of the web W. The coating device 29 includes a coating roller 5 to apply the pretreatment liquid onto the web W, an intermediate roller 6 to transfer the thinned pretreatment liquid onto the coating roller 5, and a pressure roller 7 to sandwich the web W with the coating roller 5. A supply pan 8 contains the pretreatment liquid, and the intermediate roller 6 is immersed in the pretreatment liquid inside the supply pan 8 that serves as a liquid supplier. The height of the liquid of the pretreatment liquid inside the supply pan 8 is detected by a liquid surface detector 9, which will be described later.

As illustrated in FIG. 3A, a supply pump 17 is disposed and is driven to supply the pretreatment liquid into the supply pan 8, so that an immersed amount or volume of the pretreatment liquid of the intermediate roller 6 is controlled to be constant.

The supply pan 8 is formed to cover the coating roller 5 and has a shape to prevent the pretreatment liquid contained inside the supply pan 8 from evaporating. However, a contact portion 10 between the coating roller 5 and the pressure roller 7 needs to be open and is not generally sealed completely. Accordingly, a substantially sealed reserve tank 11 and a retracting path 12 to connect the reserve tank 11 and the supply pan 8 are provided in a supply system of the pretreatment liquid coating device 52. When an electromagnetic valve 13 disposed in front of the reserve tank 11 within the retracting path 12 is opened, the pretreatment liquid is transferred from the supply pan 8 to the reserve tank 11 due to the difference in the height of the liquid, to prevent the viscosity of the pretreatment liquid from increasing.

The electromagnetic valve 13 is opened when the image forming operation is suspended for one hour, for example, which is longer than an operating period between regular jobs, such as a change of the web W or a change in the image forming condition, and is configured such that the standby time to fill in the pretreatment liquid does not occur each time the image forming operation stops. In addition, the electromagnetic valve 13 is open when the power is not turned on. Each time the power to the apparatus is turned off, the pretreatment liquid inside the supply pan 8 is transferred to the reserve tank 11, so that the pretreatment liquid is not left inside the supply pan 8 for a long time.

A circulation path 15 connecting to a filter 14 branches off from the retracting path 12, an electromagnetic valve 19 is disposed upstream of the filter 14, and a three-way valve 20 is disposed downstream of the filter 14, both valves in the circulation path 15. With this structure, while the pretreatment liquid is being applied, the electromagnetic valve 13 is properly closed and the electromagnetic valve 19 is opened in the retracting path 12, the three-way valve 20 is open to connect the filter 14 to the supply pan 8, so that a supply pump 17 is driven and a part of the pretreatment liquid inside the supply pan 8 can be passed through the filter 14. With this structure, the filter 14 removes foreign matter, such as paper dust, generated between the web W and the coating roller 5 or the pressure roller 7 and fallen inside the supply pan 8, and coagulation of the pretreatment liquid inside the supply pan 8 can be prevented. Two paths are disposed to supply the treatment liquid into the supply pan 8 of the pretreatment liquid coating device 52; one is a path 18 to connect the three-way valve 20 to cartridges 2 and 16 and supply the treatment liquid to the supply pump 17; and the other is a path directed to the supply pan 8 via the filter 14 from the circulation supply path 22 that connects the reserve tank 11 and the filter 14. The supply system of the pretreatment liquid coating device 52 further includes an empty sensor 27 and a waste liquid tank 28.

A liquid surface detector 24, disposed to the reserve tank 11, detects a liquid surface inside the reserve tank 11 and switches a supply source of the pretreatment liquid between the cartridge 16 and the reserve tank 11. When the pretreatment liquid is not present inside the reserve tank 11, new treatment liquid is supplied from the cartridges 2 and 16. When a plurality of cartridges is disposed, the cartridge to supply the pretreatment liquid is selected by the electromagnetic valves 21 and 26, disposed for the cartridges 2 and 16, respectively. In this case, when the supply pump 17 is driven in a state in which the three-way valve 20 is open to connect the cartridges 2 and 16 to the supply pan 8. When the electromagnetic valve 21 is closed and the electromagnetic valve 26 is opened, the pretreatment liquid is supplied from the cartridge 16. Thus, the driving time of the supply pump 17 and the opening time of the electromagnetic valve 26 determine the supply time of the pretreatment liquid from the cartridge 16.

When the pretreatment liquid exists inside the reserve tank 11, the electromagnetic valve 19 of the circulation path 15 is closed and the electromagnetic valve 23 of the circulation supply path 22 is open. Further, in a state in which the three-way valve 20 is open to connect the filter 14 to the supply pan 8, the supply pump 17 is driven. With this operation, the pretreatment liquid inside the reserve tank 11 is transported to the supply pan 8, so that the liquid amount of the pretreatment liquid inside the reserve tank 11 falls within a predetermined value. In addition, because the predetermined liquid passes through the filter 14 when the pretreatment liquid is supplied in the circulation supply path 22, such an effect that the pretreatment liquid sent to the reserve tank 11 can be refreshed is obtained.

In short, the coating roller 5 applies the pretreatment liquid, as a liquid, to the web W, as a recording target medium. The supply pan 8, as a liquid supplier, supplies the pretreatment liquid to the coating roller 5. The liquid surface detector 9 detects a height of the liquid surface of the pretreatment liquid inside the supply pan 8. With this structure, the coating device 29 constitutes the liquid coating device.

A location of the liquid surface detector 9 and a method for securing the liquid surface detector 9 inside the supply pan 8 are not limited in particular.

Figure 4A:
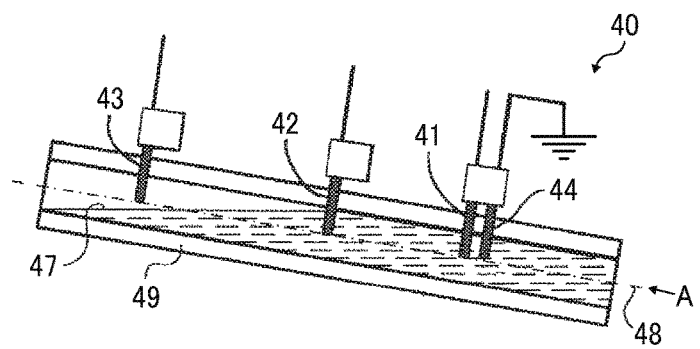
FIGS. 4A and 4B each schematically illustrate a liquid surface detector according to a comparative example.
Figure 4B:
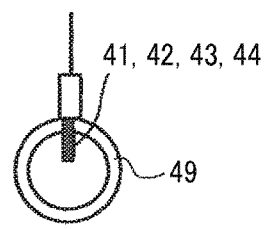

FIG. 4A is a cross-sectional view of a liquid surface detector 40 according to a comparative example FIG. 4B is a view of the liquid surface detector 40 in FIG. 4A viewed from a direction indicated by an arrow A. The liquid surface detector 40 includes a low-position electrode pin 41, a control electrode pin 42, a high-position electrode pin 43, and a ground pin 44, and is configured to detect a height of the liquid contained inside a tubular container 49 at three points at which the pretreatment liquid is stored and flows inside the tubular container 49. The liquid surface detector 40 according to the comparative example is configured such that each electrode of the grounded ground pin 44 and the electrode pins 41, 42, and 43 to which voltage is applied is disposed on a same line 48 (as indicated by a chained line of FIG. 4A), so that the liquid film of the pretreatment liquid is not dried easily when the height of the liquid surface 47 of the pretreatment liquid falls. As a result, even though the liquid surface inside the container falls, each electrode pin of the liquid surface detector 40 may detect that there remains the liquid, resulting in an erroneous detection.

Figure 5:
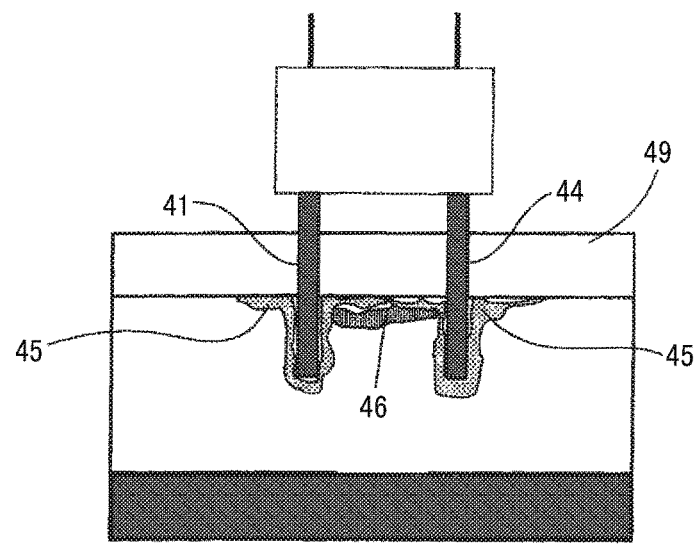
FIG. 5 is a view illustrating a problem of the liquid surface detector according to the comparative example.

Further, corrosion of each electrode pin continues due to electrolysis depending on the type of the pretreatment liquid, and foreign substance is produced due to the corrosion. FIG. 5 depicts a state of this corrosion. As illustrated in FIG. 5, foreign substance 45, such as trivalent chromium, eluted from the electrode pins adheres to the base of the electrode pin 41 and the ground pin 44. In such a state, the pretreatment liquid remains between the electrode pin 41 and the ground pin 44, to thereby form a liquid pool 46, even though the pretreatment liquid drops along the inner wall of the container when the liquid surface of the pretreatment liquid falls. As a result, the liquid surface detector continues to detect erroneously that the liquid exists.

More specifically, because a distance between the electrode pin 41 and the ground pin 44 shortens due to the foreign substance 45 eluted from the electrode pins, the pretreatment liquid tends to remain between the electrode pin 41 and the ground pin 44 due to surface tension. Unevenness is generated between the electrode pin 41 and the ground pin 44 due to the foreign substance 45 eluted from the electrode pins, thus hampering the pretreatment liquid from smoothly flowing downwards.

The above-described problem may occur not only between the electrode pin 41 and the ground pin 44 but also between any other pair of the electrode pins.

Further, the shape of the electrode pin 41 is an example, and the shape is not limited to the pin as long as the potential difference can be detected.

Figure 6A:
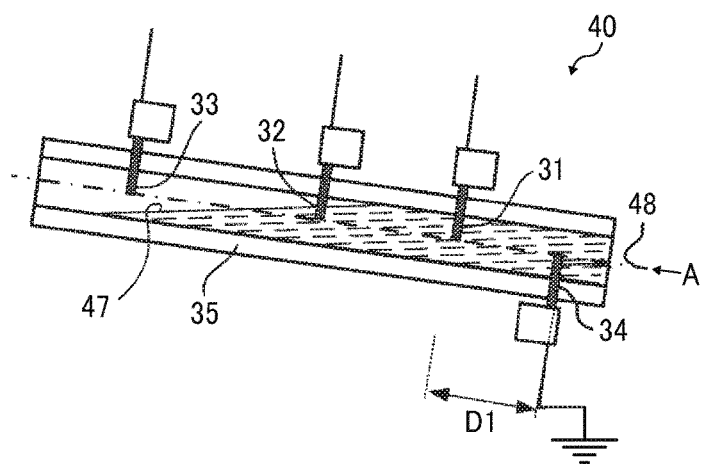
FIGS. 6A and 6B each schematically illustrate a liquid surface detector used in an embodiment of the present disclosure.
Figure 6B:
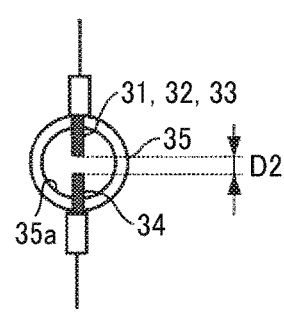

Referring to FIGS. 6A and 6B, a liquid surface detector 9 according to an embodiment of the present disclosure, capable of solving the above-described problem will be described. FIG. 6A is a cross-sectional view of the liquid surface detector 9 according to an embodiment of the present disclosure, and FIG. 6B is a view of the liquid surface detector viewed from the direction indicated by the arrow A.

The liquid surface detector 9 includes a low-position electrode pin 31, a control electrode pin 32, a high-position electrode pin 33, a grounded ground pin 34, and detects the height of the liquid surface of the pretreatment liquid inside a tube 35 connected to the supply pan 8, at three points. The tube 35 serves as a tube in which the pretreatment liquid is contained or passes. The liquid surface detector 9 to measure the height of the liquid surface 47 inside the tube 35 and to control the height of the liquid surface 47 inside the supply pan 8, applies alternating voltage to each of the electrode pins 31, 32, and 33, grounds the ground pin 34, detects an impedance between respective electrode pins and converts the detected impedance to the direct voltage, and compares the direct voltage with the reference voltage to detect the presence of the liquid.

In the above-described liquid surface detector 9, the low-position electrode pin 31 detects the liquid surface at a lower-side limit position, the control electrode pin 32 detects the liquid surface at a control position, and the high-position electrode pin 33 detects the liquid surface at an upper-side limit position, respectively. The ground pin 34 extends toward a direction different from the direction in which each of the electrode pins 31, 32, and 33 extends as viewed from the axial direction of the tube 35.

In other words, the ground pin 34 is offset from the electrode pin 31 by a distance D1 along the axial direction and is disposed opposite the electrode pin 33 as viewed from the axial direction.

With the above structure, the distance between the grounded ground pin 34 and the low-position electrode pin 31 nearest to the ground pin 34 among the electrode pins of the voltage applying side is maximized, so that the filminess or the downward fluidity of the pretreatment liquid on the inner wall 35a of the tube 35 can be improved. As a result, even though the foreign substance caused by the corrosion of the electrode pins adheres to the inner wall 35a of the tube 35, conduction due to the pretreatment liquid that remains at a portion between electrode pins can be prevented, and the liquid surface detector that can prevent occurrence of the erroneous detection can be provided.

The distance between the ground pin 34 and the electrode pin 31 is lengthened and the both pins are disposed opposite as viewed from the axial direction, so that little surface tension does not act on between the ground pin 34 and the electrode pin 31, thus preventing the pretreatment liquid from staying. In the present embodiment, as illustrated in FIG. 6B, because the ground pin 34 and the electrode pin 31 are separated by a distance D2, a greater effect can be obtained.

If the electrode pin 31 and the ground pin 34 are simply separated by the distance D1, enough non-filminess effect can be obtained. In this case, the long tube 35 is required. However, according to the present disclosure, the respective pins extend from different directions as viewed from the axial direction so as not to overlap each other. Accordingly, the tube 35 can be compact and the non-filminess effect can be obtained.

In the above-described structure, it is preferred that the inner wall 35a of the tube 35 be formed of a material with a high releasability. Use of this structure further improves non-filminess of the pretreatment liquid adhered on the inner wall 35a of the tube 35, so that the pretreatment liquid can be further prevented from remaining at a portion between electrode pins. Further, foreign substance due to corrosion of the electrode pins is less likely to adhere on the inner wall 35a of the tube 35.

Figure 7:
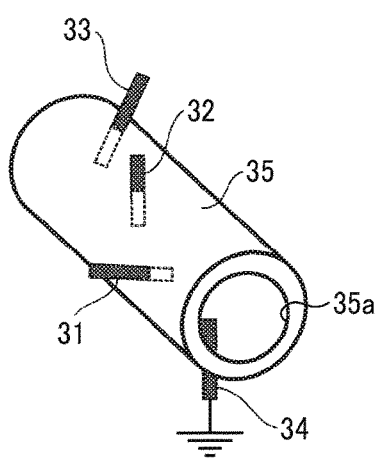
FIG. 7 schematically illustrates a liquid surface detector used in another embodiment of the present disclosure.
Figure 8:
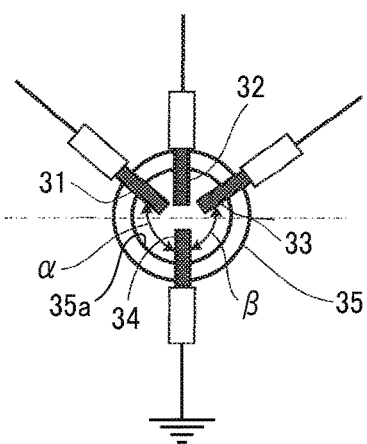
FIG. 8 schematically illustrates a liquid surface detector used in further another embodiment of the present disclosure.

FIGS. 7 and 8 illustrate structures of the liquid surface detector according to other embodiments of the present disclosure. In the embodiments illustrated in FIGS. 7 and 8, each of the electrode pins 31, 32, and 33 is disposed opposite the ground pin 34, and free ends of the electrode pins 31, 32, and 33 disposed around the inner side of the tube 35 are positioned spirally. Specifically, a state in which each of the electrode pins 31, 32, and 33 is disposed opposite the ground pin 34 means that an angle α between the electrode pin 31 and the ground pin 34 and an angle β between the electrode pin 33 and the ground pin 34 are both 90 degrees or more. The electrode pins 31 and 33 are nearest to the ground pin 34 in the circumferential direction of the tube 35.

Namely, the ground pin 34 is disposed at a lower side of the tube 35 in the vertical direction (gravitational direction) as viewed from the axial direction, and the angle formed by the ground pin 34 and each of the electrode pins 31, 32, and 33 is 90 degrees or more as viewed from the axial direction.

If viewed from the axial direction, the ground pin 34 is disposed at a position lower than the center (or the chained line as indicated in FIG. 8) of the tube 35, and the electrode pin 31 is disposed at a position higher than the center of the tube 35.

With the above-described structures, when the pretreatment liquid is delivered through the tube 35, the line connecting adjacent electrode pins is not parallel to the direction in which the pretreatment liquid flows, that is, the axial direction. Accordingly, the pretreatment liquid flowing from upstream does not enter the electrode pin disposed downstream. With this structure, the pretreatment liquid flowing from upstream does not worsen non-filminess of the liquid at a portion between electrode pins. Further, a delay in time of the liquid surface of the pretreatment liquid inside the supply pan 8 with the liquid surface inside the tube 35 can be eliminated and the pretreatment liquid coating device 52 can be made compact.

In each of the above-described embodiments, the cross-section of the tube 35 is a circular shape. However, the shape is not limited and the cross-section may be, e.g., a polygonal shape or a shape with one open end.

Also, in each of the above-described embodiments, the intermediate roller 6 is disposed in addition to the coating roller 5; however, the structure is not limited to this. In other words, any other structure can be employed in which the treatment liquid inside the supply pan 8 can be applied to the recording target medium. For example, only one coating roller 5 may be disposed without the intermediate roller 6.

The liquid surface detector may be used for detecting the liquid surface of the post-treatment liquid to be coated on the image, and the type of the liquid is not limited to the pretreatment liquid. The pretreatment liquid may be a liquid to improve adhesiveness of the ink for image formation and the recording target medium, or an undercoat liquid to improve image quality.

The liquid surface detector and the liquid coating device in the above-described embodiments may be applied to a part of a liquid discharge apparatus. Hereinafter, the liquid discharge apparatus according to one embodiment will be described. In the following explanation, the primary liquid means the ink, i.e., the second liquid, to form images, and is different from the aforementioned pretreatment liquid or the first liquid.

In the above-described embodiments, the web W is used as the recording target medium on which the image is to be formed. The web W is not limited to the recording sheet, and includes, e.g., a thick sheet, a postcard, an envelope, normal paper, thin paper, coated paper and art paper, and tracing paper. As a transfer medium other than the sheet, an OHP sheet, OHP film, and resin film may be used as far as it includes a sheet shape and is capable of forming the image thereon.

Figure 9:
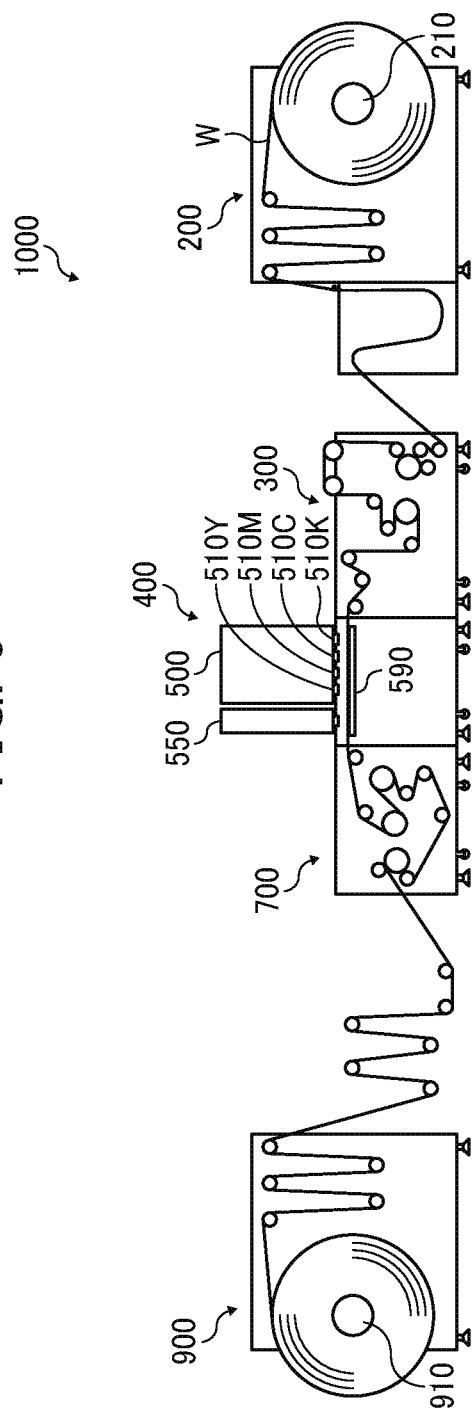
FIG. 9 schematically illustrates an exemplary liquid discharge apparatus used in another embodiment of the present disclosure.
Figure 10:
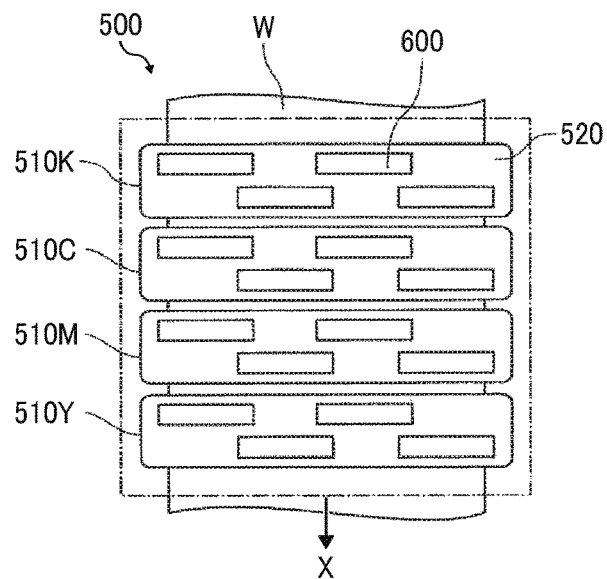
FIG. 10 is an exemplary plan view of a head unit disposed in the liquid discharge apparatus illustrated in FIG. 9.

Next, referring to FIGS. 9 and 10, a liquid discharge apparatus according to an embodiment of the present disclosure will be described. FIG. 9 schematically illustrates the liquid discharge apparatus, and FIG. 10 is a plan view of an exemplary head unit used for the liquid discharge apparatus.

As illustrated in FIG. 9, a printing apparatus 1000 serving as a liquid discharge apparatus includes: a feeder 200 to feed a continuous web W as a recording target medium; a guide feeder 300 to guide and feed the web W fed from the feeder 200 to a printer 400; and the printer 400 to discharge liquid onto the web W to thereby form an image; a dryer 700 to dry the web W; and an ejector 900 to eject the web W.

The guide feeder 300 may be replaced with the pretreatment liquid coating device 52 described with reference to FIG. 2, and feeds the web W (or the recording target medium) and applies the pretreatment liquid to the web W.

The web W is sent from an original roller 210 of the feeder 200, and is guided and conveyed by each roller of the guide feeder 300, the dryer 700 and the ejector 900, and is wound up by a wind-up roller 910.

The web W is conveyed in a conveyance direction X (see FIG. 10) opposite a head unit 500 and a head unit 550 on a conveyance guide unit 590 in the printer 400, and the head unit 500 discharges liquid onto the web W to thereby form an image on the web W. The head unit 550 discharges a treatment liquid onto the web W as a post-treatment process.

Herein, the head unit 500 includes four color full-line type head arrays 510K, 510C, 510M, and 510Y (which is called collectively a head array 510, if each color is not distinguished) from upstream in the conveyance direction of the recording target medium.

Each head array 510 serves as liquid discharger to discharge a liquid, and the head arrays 510K, 510C, 510M, and 510Y discharge the liquid of black K, cyan C, magenta M, and yellow Y, respectively, to the web W. The type and the number of the colors are not limited to the above examples.

As illustrated in FIG. 10, the head array 510 is, for example, configured such that a plurality of liquid discharge heads (or also simply referred to as a plurality of heads) 600 is positioned on a base 520 in a staggered manner, but how the heads are arranged is not limited to this.

Figure 11:
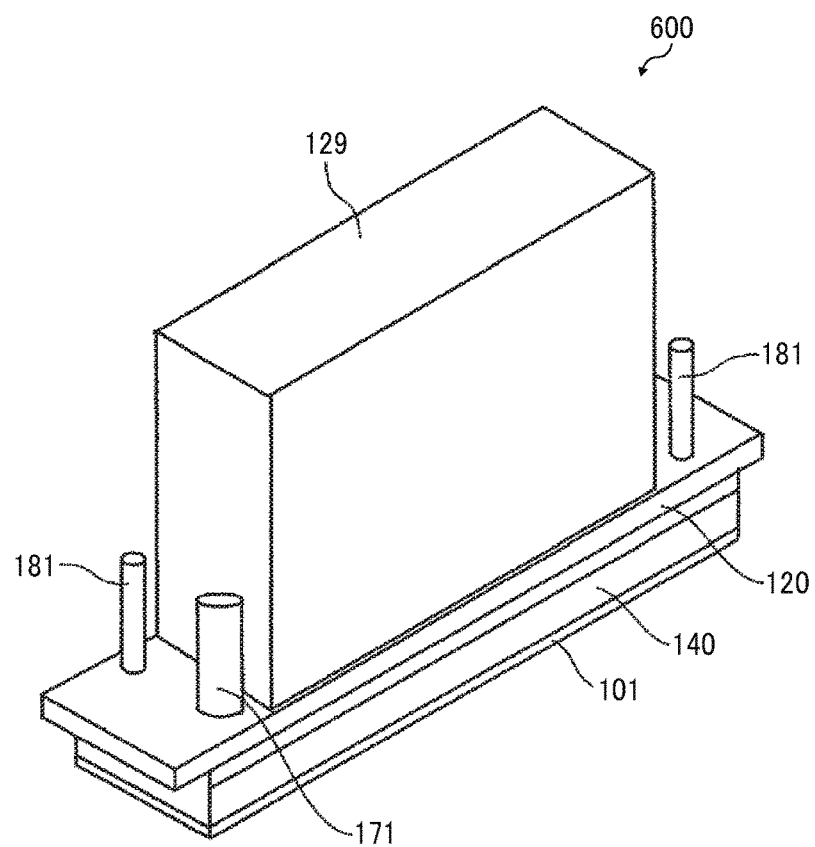
FIG. 11 is an external perspective view of an exemplary liquid discharge head.

Next, referring to FIGS. 11 and 12, one exemplary liquid discharge head will be explained. FIG. 11 is an outer perspective view of the liquid discharge head, and FIG. 12 is a cross-sectional view of the head in a direction perpendicular to the nozzle alignment direction of the head, that is, in a liquid chamber longitudinal direction.

Figure 12:
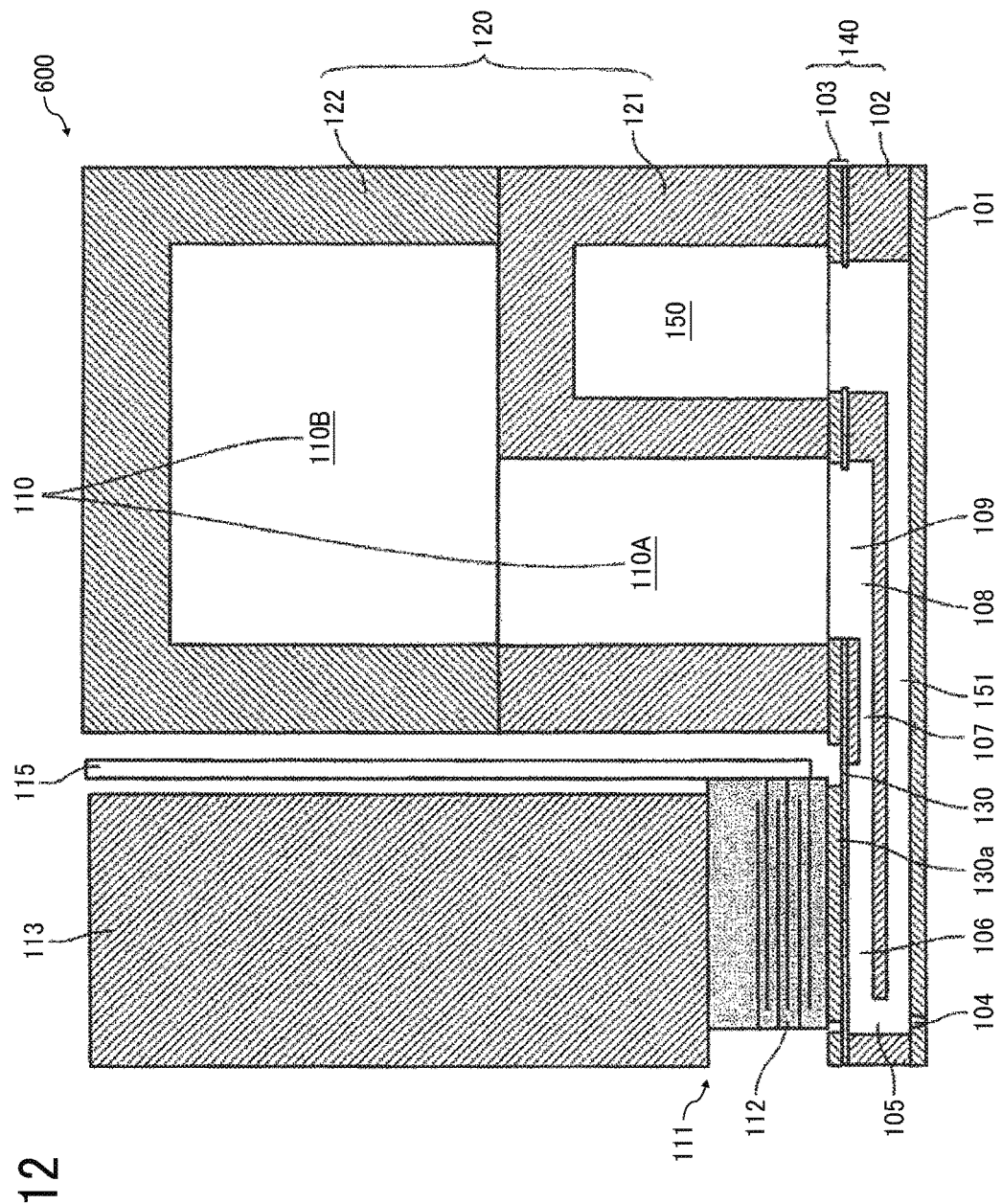
FIG. 12 is a cross-sectional view of the liquid discharge head of FIG. 11 in a direction perpendicular to a nozzle alignment direction, i.e., a liquid chamber longitudinal direction.

As illustrated in FIGS. 11 and 12, the liquid discharge head 600 includes a nozzle plate 101, a channel plate 102, and a diaphragm member 103 as a wall member. The nozzle plate 101, the channel plate 102, and the diaphragm member 103 are laminated in layers. Further, the liquid discharge head 600 includes a piezoelectric actuator 111 to displace a vibration area 130 of the diaphragm member 103; a common liquid chamber substrate 120 that also serves as a frame of the head; and a cover 129. Further, the channel plate 102 and the diaphragm member 103 constitute a channel member 140.

The nozzle plate 101 includes a plurality of nozzles 104 each to discharge liquid.

The channel plate 102 includes an individual liquid chamber 106 communicating with the nozzle 104 via a nozzle communication path 105; a supply-side fluid restrictor 107 communicating with the individual liquid chamber 106; a through-hole and a groove serving as a liquid inlet 108 communicating with the supply-side fluid restrictor 107. The nozzle communication path 105 is a channel communicating with each of the nozzle 104 and the individual liquid chamber 106. In addition, the liquid inlet 108 communicates with a supply-side common liquid chamber 110 via an opening 109 of the diaphragm member 103.

The diaphragm member 103 includes a deformable vibration area 130 that forms a wall of the individual liquid chamber 106 of the channel plate 102. Herein, the diaphragm member 103 has a two-layer structure (but not limited to). The diaphragm member 103 includes, from a side facing the channel plate 102, a first layer forming a thin-walled portion and a second layer forming a thick-walled portion. The deformable vibration area 130 is formed on a portion corresponding to the individual liquid chamber 106 on the first layer.

The piezoelectric actuator 111 including an electro-mechanical conversion device, which serves as a driving device (actuator device or pressure generator) to deform the vibration area 130 of the diaphragm member 103 is disposed at a side of the diaphragm member 103 opposite a side facing the individual liquid chamber 106.

The piezoelectric actuator 111 includes the piezoelectric member joined to the base 113. The piezoelectric member is groove-formed by half-cut dicing into a predetermined number of pillar-shaped piezoelectric elements 112. The piezoelectric elements 112 are arranged at a predetermined interval in a comb shape.

The piezoelectric element 112 is joined to a protrusion 130a as an island-shaped thick-walled portion formed on the vibration area 130 of the diaphragm member 103. A flexible wire 115 is connected to the piezoelectric element 112.

The common liquid chamber substrate 120 forms the supply-side common liquid chamber 110 and a delivery-side common liquid chamber 150. The supply-side common liquid chamber 110 communicates with a supply port 171, and the delivery-side common liquid chamber 150 communicates with a delivery side port 181.

Herein, the common liquid chamber substrate 120 is constituted of a first common liquid chamber wall 121 and a second common liquid chamber wall 122. The first common liquid chamber wall 121 is joined to the diaphragm member 103 of the channel member 140, and the second common liquid chamber wall 122 is laminated on and bonded to the first common liquid chamber wall 121 in layers.

The first common liquid chamber wall 121 forms a downstream common liquid chamber 110A as a part of the supply-side common liquid chamber 110 communicating with the liquid inlet 108, and the delivery-side common liquid chamber 150 communicating with a delivery channel 151. The second common liquid chamber wall 122 forms an upstream common liquid chamber 110B as a rest of the supply-side common liquid chamber 110.

Further, the delivery channel 151 along the plane direction of the channel plate 102 communicating to each individual liquid chamber 106 via the nozzle communication path 105 is formed in the channel plate 102. The delivery channel 151 communicates with the delivery-side common liquid chamber 150.

In the liquid discharge head 600, the piezoelectric element 112 shrinks when the voltage applied to the piezoelectric element 112 is decreased from the reference or mean electric potential, the vibration area 130 of the diaphragm member 103 is pulled, and a volume of the individual liquid chamber 106 increases, so that a liquid enters the individual liquid chamber 106.

When the voltage applied to the piezoelectric element 112 is increased, the piezoelectric element 112 is expanded in the layered direction, the vibration area 130 of the diaphragm member 103 is deformed in a direction toward the nozzle 104, and the volume in the individual liquid chamber 106 reduces. As a result, the liquid inside the individual liquid chamber 106 is pressed, and the liquid is discharged from the nozzle 104.

The liquid not discharged from the nozzle 104 passes by the nozzle 104 and is delivered to the delivery-side common liquid chamber 150 via the delivery channel 151, and is again supplied to the supply-side common liquid chamber 110 via an outside circulation path.

How to drive the head is not limited to the above pull-push method, but the head may be driven to be pulled and pushed depending on given drive waveforms.

In the present disclosure, the discharged liquid may be of a type that can be discharged from the head having viscosity and surface tension, and is not limited in particular. However, it is preferred that the liquid have a viscosity of 30 mPas or lower under normal temperature and pressure, or by heating or cooling. More specifically, examples of the liquid include a solution, suspension liquid, or emulsion including, for example, solvent, such as water or an organic solvent, colorant, such as dye or pigment, polymerizable compounds, resins, functionality imparting material, such as surfactant, biocompatible material, such as DNA, amino acid, protein, and calcium, edible material, such as a natural pigment. Those materials are used for inkjet ink, surface treatment liquid, structuring element for electronic element and light-emitting element, forming liquid of electronic circuit resist pattern, and for three-dimensional fabricating material liquid.

The liquid discharge head includes an energy-generating source to discharge liquid. Examples of the energy-generating source includes a piezoelectric actuator (such as a layered-type piezoelectric element and thin-film type piezoelectric element); a thermal actuator using electro-thermal conversion element such as heat-generating resistor; and an electrostatic actuator including a diaphragm and an opposite electrode.

The liquid discharge apparatus may be an apparatus to discharge liquid by driving a liquid discharge head. The device to discharge a liquid includes not only a type of a device to discharge the liquid onto a medium onto which the liquid can be adhered, but also a type of a device to discharge liquid to air and into a liquid.

The liquid discharge apparatus may include devices to feed, convey, and discharge the medium onto which the liquid can be adhered, a pretreatment device, and a post-treatment device.

Examples of the liquid discharge apparatus include an image forming apparatus to discharge ink onto a sheet to form an image on the sheet; and a three-dimensional fabricating apparatus to discharge a fabrication liquid onto a powdery layer in which a powder body is formed in layers, to form a three-dimensional fabrication object (solid fabrication object).

Further, the liquid discharge apparatus is not limited to an apparatus to visualize an image having a meaning, such as a letter or a figure, by the discharged liquid. The liquid discharge apparatus may be, for example, an apparatus to form a pattern having no meaning or a three-dimensional image.

A medium onto which the liquid can be adhered, means the medium onto which the liquid can adhere even at least temporarily, the medium onto which the liquid adheres and fixes, and the medium onto which the liquid adheres and permeates. Specifically, examples are recording target media, such as a sheet, a recording sheet, a film, and cloth, electrical parts, such as an electrical board and a piezoelectric element, powdery layer, a model for organ, and an inspection cell, and other media, and includes anything on which the liquid can adhere.

The materials onto which the liquid can adhere include paper, thread, fiber, cloth, leather, metal, plastic, glass, wood, and ceramics, and may be a material on which the liquid can adhere even temporarily.

Further, the liquid discharge apparatus includes an apparatus in which the liquid discharge head and the medium onto which the liquid can adhere, move relatively, but is not limited to this. For example, the liquid discharge apparatus may be a serial-type apparatus in which the liquid discharge head is moved, and a line-type apparatus in which the liquid discharge head is not moved.

Further, the liquid discharge apparatus may be or include a treatment liquid coating device to discharge a treatment liquid onto a sheet to coat the treatment liquid on a surface of the sheet for improving the quality of the surface of the sheet; and an injection granulator to inject composition liquid formed by dispersing row materials into solution via the nozzle and granulate minute particles of raw materials.

In the present disclosure, image formation, recording, printing, molding, and the like may be used synonymously with each other.

Various embodiments of the present disclosure have been described heretofore: however, the present disclosure is not limited to the embodiments as specified above, and various modifications and variations may be possible within the scope of the claimed invention, unless otherwise limited in the above description in particular. Examples of the various modifications and variations are explained appropriately in the above related sections. The effects described in the embodiments of the present disclosure show only the most optimal effects exerted in the present disclosure, and the effects of the present disclosure are not limited to those described in the embodiments of the present disclosure.

Additional modifications and variations of the present disclosure are possible in light of the above teachings. It is therefore to be understood that, within the scope of the appended claims, the disclosure may be practiced other than as specifically described herein.

What is claimed is:

1. A liquid coating device, comprising:
   a liquid surface detector including:
      a tube including a tubular portion through which a liquid passes;
      plural electrode pins each disposed on an inner wall of the tubular portion of the tube; and
      a ground pin disposed on the inner wall of the tubular portion of the tube,
   wherein the inner wall of the tubular portion extends longitudinally in a direction parallel to an axial direction of the tubular portion, and each of the ground pin and the plural electrode pins is disposed on the inner wall extending longitudinally in the direction parallel to the axial direction of the tubular portion;
   a coating roller to apply the liquid to a recording target medium; and
   a liquid supplying device to supply the liquid to the coating roller;
   wherein as viewed from the axial direction of the tubular portion, the ground pin is disposed to one side of a diameter line passing through a diameter and a center point of the tubular portion, and all of the plural electrode pins as a group are disposed to an opposite side of the diameter line, opposite to said one side at which the ground pin is disposed,
   wherein the liquid surface detector detects a height of a liquid surface of the liquid in the liquid supplying device, and
   wherein the tube of the liquid surface detector is disposed in an inclined state in which the tube is inclined relative to a bottom of the liquid supplying device and the ground pin is disposed at a lower portion of the tube in a gravity direction.

2. A liquid discharge apparatus comprising:
   the liquid coating device according to claim 1, to apply the liquid to the recording target medium; and
   a liquid discharge head to discharge another liquid onto the recording target medium.

3. The liquid coating device according to claim 1, wherein the plural electrode pins extend in different respective directions.

4. The liquid coating device according to claim 1, wherein the plural electrode pins and the ground pin protrude from the same inner wall of the tubular portion of the tube and extend in different respective directions as viewed from the axial direction of the tube.

5. The liquid surface detector according to claim 1, wherein an angle β between the ground pin and each of the plural electrode pins is 90 degrees or more.

* * * * *